United States Patent
Xu et al.

(10) Patent No.: US 11,286,871 B1
(45) Date of Patent: Mar. 29, 2022

(54) USING AN ARTIFICIAL NEURAL NETWORK FOR GAS FLOWS ESTIMATION IN A SPARK IGNITIED INTERNAL COMPUTER ENGINE

(71) Applicants: Shuonan Xu, Troy, MI (US); David A Lawrence, Lake Orion, MI (US); Ethan E Bayer, Lake Orion, MI (US)

(72) Inventors: Shuonan Xu, Troy, MI (US); David A Lawrence, Lake Orion, MI (US); Ethan E Bayer, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/158,459

(22) Filed: Jan. 26, 2021

(51) Int. Cl.
*F02D 41/14* (2006.01)
*F02D 41/24* (2006.01)
*F02D 41/00* (2006.01)
*G06N 3/08* (2006.01)

(52) U.S. Cl.
CPC ..... *F02D 41/1405* (2013.01); *F02D 41/0002* (2013.01); *F02D 41/2432* (2013.01); *F02D 41/2445* (2013.01); *F02D 41/2454* (2013.01); *F02D 41/2477* (2013.01); *G06N 3/08* (2013.01)

(58) Field of Classification Search
CPC ............. F02D 41/0002; F02D 41/1405; F02D 41/2432; F02D 41/2445; F02D 41/2454; F02D 41/2477; G06N 3/08
See application file for complete search history.

(56) References Cited

U.S. PATENT DOCUMENTS

| | | | |
|---|---|---|---|
| 7,174,250 B2* | 2/2007 | Barba | F02M 26/47 |
| | | | 701/108 |
| 7,299,123 B2 | 11/2007 | Taglialatela-Scafati et al. | |
| 10,100,773 B2* | 10/2018 | Surnilla | F02D 41/0025 |
| 10,132,260 B2* | 11/2018 | Meldrum | F02D 41/263 |
| 10,196,997 B2 | 2/2019 | Merlino et al. | |
| 10,221,794 B1* | 3/2019 | Attard | F02D 41/1453 |
| 2020/0018251 A1* | 1/2020 | Kromrey | F01L 1/344 |
| 2020/0116094 A1* | 4/2020 | Ge | F01N 3/0842 |

* cited by examiner

*Primary Examiner* — Hung Q Nguyen
*Assistant Examiner* — Mark L. Greene
(74) *Attorney, Agent, or Firm* — Ralph E. Smith (57) ABSTRACT

A combustion control method and system for an engine of a vehicle comprises a controller configured to access a trained feedforward artificial neural network configured to model a volumetric efficiency (VE) of the engine based on measured engine speed, engine intake manifold absolute pressure, intake and exhaust camshaft positions, intake air temperature, and engine coolant temperature, generate a base VE of the engine using the trained feedforward artificial neural network and the measured parameters, estimate an air charge mass flowing to each cylinder of the engine based on the base VE of the engine, and control combustion in the cylinders of the engine based on the estimated air charge mass to improve at least one of combustion stability, torque response, and fuel economy.

17 Claims, 5 Drawing Sheets

USING AN ARTIFICIAL NEURAL NETWORK FOR GAS FLOWS ESTIMATION IN A SPARK IGNITIED INTERNAL COMPUTER ENGINE

FIELD

The present application generally relates to spark ignition (SI) engines and, more particularly, to techniques for using an artificial neural network (ANN) for gas flows estimation and combustion control in SI internal combustion engines.

BACKGROUND

In today's engines, fuel quantity and spark timing relative to air charge quantity affects the quality of combustion. It is therefore desirable to accurately estimate the air charge because poor combustion quality due to inaccurate fuel/spark control could result in decreased fuel economy and/or engine knock. Conventional combustion control techniques for SI engines use an empirical approach where multiple calibration tables and surfaces are utilized to estimate the air charge. This requires a substantial calibration effort and increased processor throughput. External factors that are constantly changing could also affect air charge estimation accuracy. Accordingly, while such SI combustion control systems do work for their intended purpose, there remains a need for improvement in the relevant art.

SUMMARY

According to one example aspect of the invention, a combustion control system for an engine of a vehicle is presented. In one exemplary implementation, the system comprises a set of sensors configured to measure at least six parameters including engine speed, engine intake manifold absolute pressure (MAP), intake and exhaust camshaft positions, intake air temperature (IAT), and engine coolant temperature (ECT) a controller configured to access a trained feedforward artificial neural network configured to model a volumetric efficiency (VE) of the engine based on engine speed, engine intake MAP, intake and exhaust camshaft positions, IAT, and ECT, generate a base VE of the engine using the trained feedforward artificial neural network with the six measured parameters from the set of sensors as inputs, estimate an air charge mass flowing to each cylinder of the engine based on the base VE of the engine, and control combustion in the cylinders of the engine based on the estimated air charge mass to improve at least one of combustion stability, torque response, and fuel economy.

In some implementations, the controller is further configured to perform a downstream adjustment of the estimated air charge mass based on a two-dimensional (2D) empirical surface having IAT and ECT as inputs. In some implementations, the controller is further configured to perform a downstream adjustment of the base VE of the engine based on at least one of one or more VE correction factors and one engine speed density factor.

In some implementations, the controller is further configured to access the trained ANN from an external calibration system that is configured to train an untrained ANN using calibration data collected by the external calibration system during a calibration period for the vehicle. In some implementations, the calibration period is divided into (i) a first calibration sub-period where nominal calibration data is collected followed by (ii) a second calibration sub-period where off-nominal calibration data is collected up until vehicle launch, and the external calibration system is configured to, during the first sub-period, collect a first set of calibration data for four of the six parameters including engine speed, intake MAP, and intake and exhaust camshaft positions.

In some implementations, the external calibration system is configured to, during the first calibration sub-period and after collecting the first set of calibration data, collect a second set of calibration data comprising nominal for all six of the parameters including IAT and ECT thereby eliminating the need for collection of calibration data during the second calibration sub-period. In some implementations, the inputs to the trained ANN are only the six measured parameters from the set of sensors.

In some implementations, the trained ANN is defined by two layers with 12 neurons per layer. In some implementations, the set of sensors comprise (i) an engine speed sensor, (ii) an intake MAP sensor, (iii) intake and exhaust camshaft position sensors, (iv) an IAT sensor, and (v) an ECT sensor.

According to another example aspect of the invention, a combustion control method for an engine of a vehicle is presented. In one exemplary implementation, the method comprises accessing, by a controller of the vehicle, a trained feedforward artificial neural network configured to model a volumetric efficiency (VE) of the engine based on engine speed, engine intake manifold absolute pressure (MAP), intake and exhaust camshaft positions, intake air temperature (IAT), and engine coolant temperature (ECT), receiving, by the controller and from a set of sensors of the vehicle, at least six measured parameters including engine speed, engine intake MAP, intake and exhaust camshaft positions, IAT, and ECT, generating, by the controller, a base VE of the engine using the trained feedforward artificial neural network with the six measured parameters from the set of sensors as inputs, estimating, by the controller, an air charge mass flowing to each cylinder of the engine based on the base VE of the engine, and controlling, by the controller, combustion in the cylinders of the engine based on the estimated air charge mass to improve at least one of combustion stability, torque response, and fuel economy.

In some implementations, the method further comprises performing, by the controller, a downstream adjustment of the estimated air charge mass based on a two-dimensional (2D) empirical surface having IAT and ECT as inputs. In some implementations, the method further comprises performing, by the controller, a downstream adjustment of the base VE of the engine based on at least one of one or more VE correction factors and one engine speed density factor.

In some implementations, the method further comprises accessing, by the controller, the trained ANN from an external calibration system that is configured to train an untrained ANN using calibration data collected by the external calibration system during a calibration period for the vehicle. In some implementations, the calibration period is divided into (i) a first calibration sub-period where nominal calibration data is collected followed by (ii) a second calibration sub-period where off-nominal calibration data is collected up until vehicle launch, and the method further comprises during the first calibration sub-period, collecting, by the external calibration system, a first set of calibration data for four of the six parameters including engine speed, intake MAP, and intake and exhaust camshaft positions.

In some implementations, the method further comprises during the first calibration sub-period and after collecting the first set of calibration data, collecting, by the external calibration system, a second set of calibration data for all six of the parameters including IAT and ECT thereby eliminating the need for collection of calibration data during the second calibration sub-period. In some implementations, the inputs to the trained ANN are only the six measured parameters from the set of sensors.

In some implementations, the trained ANN is defined by two layers with 12 neurons per layer. In some implementations, the set of sensors comprise (i) an engine speed sensor, (ii) an intake MAP sensor, (iii) intake and exhaust camshaft position sensors, (iv) an IAT sensor, and (v) an ECT sensor.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DETAILED DESCRIPTION

As previously discussed, there remains a need for accurate air charge estimation for accurate combustion control in spark ignition (SI) engines that do not require substantial empirically calibrated surfaces. Such empirical based techniques are also inaccurate at certain operating conditions, such as off-nominal temperatures. Accordingly, improved SI engine combustion control techniques are presented that use a trained feedforward artificial neural network (ANN) to model a base volumetric efficiency (VE) of the engine based on six inputs: engine speed, intake manifold absolute pressure (MAP), intake and exhaust camshaft positions, intake air temperature (IAT), and engine coolant temperature (ECT).

The ANN could be trained, for example, by an external calibration system using dynamometer data for the SI engine that is collected by the external calibration system during a calibration period of the vehicle. In one exemplary implementation, the external calibration system is configured to collect all necessary nominal and off-nominal calibration data during an initial first calibration sub-period, thereby eliminating the need to collect calibration data during a second calibration sub-period typically reserved for off-nominal calibration data collection up until vehicle launch.

Figure 1:
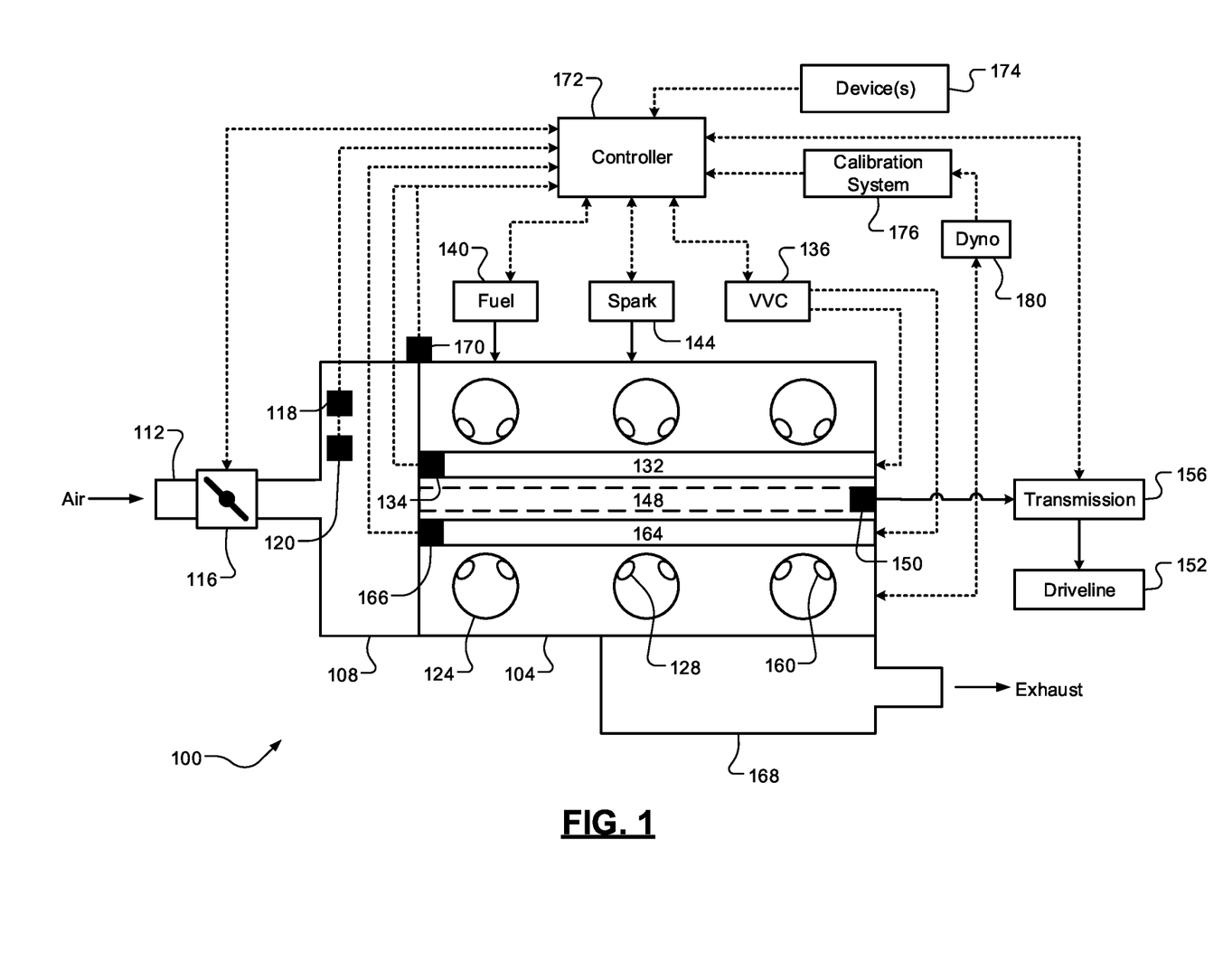
FIG. 1 is a diagram of a vehicle having an example spark ignition (SI) engine according to the principles of the present application.

Referring now to FIG. 1, a diagram of an example vehicle 100 comprising an engine 104. While the engine 104 is shown as and described to be an SI engine, it will be appreciated that the techniques of the present application could be applicable to other suitable engines, such as a diesel engine or a mixed-mode engine (e.g., capable of operating in both an SI-mode and a compression ignition (CI) mode). The engine 104 draws air into an intake manifold 108 through an induction system 112 that is regulated by a throttle valve 116. An intake MAP sensor 118 and an IAT sensor 120 measure pressure and temperature of an air charge being provided to each of a plurality of cylinders 124 of the engine 104. While six cylinders are shown, it will be appreciated that the engine 104 could include any suitable number of cylinders. Intake valves 128 regulate the flow into the respective cylinders 124. The intake valves 128 are actuated by lobes of an intake camshaft 132, which is also connected to a VVC system 136 that is configured to adjust the actuation of the intake valves 128 by the intake camshaft 132 to adjust intake valve lift and/or timing. Camshaft position sensor 134 measures a position of the intake camshaft 132.

The air charge for each cylinder is combined with fuel (e.g., gasoline) from a fuel system 140 (via direct or port fuel injection) and the air/fuel mixture is compressed by respective pistons (not shown) within the cylinders 124. The compressed air/fuel mixture is then ignited by spark provided by a spark system 144 (e.g., one or more spark plugs for each respective cylinder 124). The combustion of the compressed air/fuel mixture drives the pistons, which in turn rotatably turn a crankshaft 148 thereby generating drive torque. Engine speed sensor 150 measures a rotational speed of the crankshaft 148. The drive torque at the crankshaft 148 is then transferred to a driveline 152 of the vehicle 100 via a transmission 156. It will be appreciated that the engine 104 could comprise a forced-induction or boost system (not shown), such as a turbocharger, a supercharger, or combinations thereof. This boost system enables the engine 104 to draw in a larger air charge, which could then be combined with a larger amount of fuel to generate increased levels of drive torque.

Exhaust gas resulting from combustion is expelled from the cylinders 124 via respective exhaust valves 160 that regulate the flow out of the respective cylinders 124. The exhaust valves 160 are actuated by lobes of an exhaust camshaft 164, which is also connected to the VVC system 136. Similar to the intake valves/camshaft, the VVC system 136 is configured to adjust exhaust valve lift and/or timing. Camshaft position sensor 166 measures a position of the exhaust camshaft 164. The exhaust gas expelled from the cylinders 124 is then treated by an exhaust system 168 to eliminate or mitigate emissions before being released into the atmosphere. Non-limiting example components of the exhaust system 168 include an exhaust manifold and a three-way catalytic converter.

An ECT sensor 170 measures a temperature of a coolant (water, oil, etc.) flowing through and thereby cooling the engine 104. A controller 172 controls operation of the engine 104. The controller 172 is configured to receive input from one or more input devices 174 as well as the various sensors 118, 120, 134, 150, 166, and 170. One non-limiting example of the one or more input devices 174 is an accelerator pedal. For example, a driver of the vehicle 100 could provide input via the accelerator pedal, which is indicative of a torque request. The controller 172 then controls the engine 104 (e.g., airflow, fuel, and spark) to achieve the torque request.

A remote calibration system 176 that is not part of the vehicle 100 comprises a computer system that interacts with a dynamometer 180 (e.g., dynamometer sensors), which could be part of or separate from the calibration system 176, to obtain dynamometer data for the engine 104, which is utilized to generate an ANN calibration that is provided as input to the controller 172 and then utilized for combustion phasing control. The term "obtain" as used herein refers to all of the generated ANN calibration being transmitted to the controller 172 for storage in its memory and subsequent retrieval for usage. The ANN is designed such that it is capable of accurately estimating air charge for subsequent combustion control in an SI engine. This design process involves the selection of various parameters, such as, but not limited to, input/output type and quantity, number of hidden layers, number of neurons per layer, and activation/transfer functions. In one exemplary implementation, the trained ANN defines 12×12 neurons per layer, while it will be appreciated that a slightly larger trained ANN could be utilized (e.g., 13×13 neurons per layer) at the cost of slightly increased processor throughput.

Figure 2:
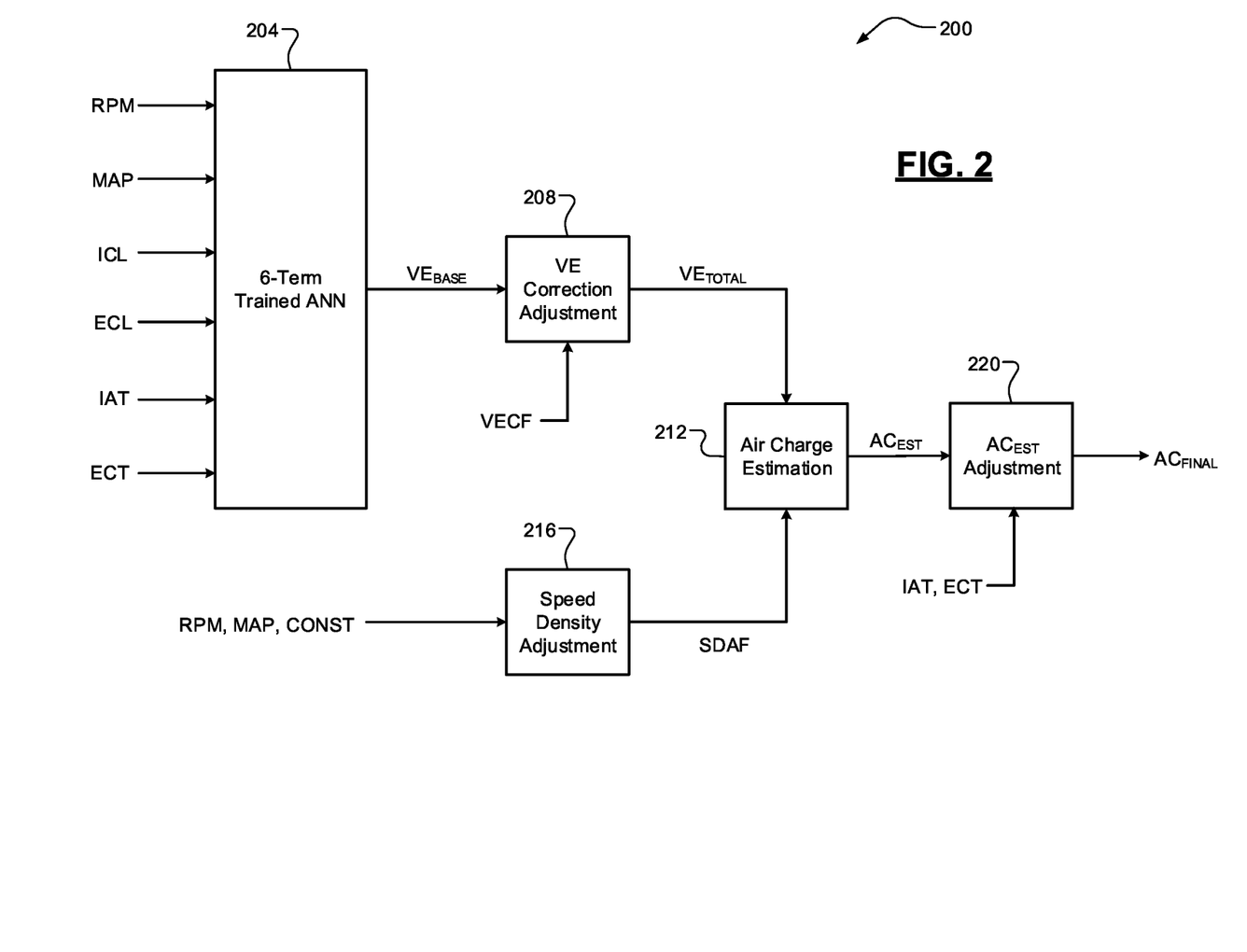
FIG. 2 is a functional block diagram of an example volumetric efficiency (VE) generation and air charge estimation architecture according to the principles of the present application.

Referring now to FIG. 2, a functional block diagram of an example base VE generation and air charge estimation architecture 200 according to the principles of the present application is illustrated. It will be appreciated that the architecture 200 could be at least partially implemented by the controller 172 or another suitable vehicle controller or control system. Block 204 corresponds to the 6-term trained ANN, which receives engine speed (revolutions per minute, or RPM), MAP, intake camshaft position (intake camshaft lift, or ICL), exhaust camshaft position (exhaust camshaft lift, or ECL), IAT, and ECT as inputs. Block 204 generates a base VE ($VE_{BASE}$) of the engine 104. This base VE $VE_{BASE}$ is optionally adjusted based on one or more VE correction factors (VECF) at optional VE correction adjustment block 208, which could be parameters or constants corresponding to a particular design or configuration of the engine 104. The adjusted VE ($VE_{TOTAL}$) is fed to air charge estimation block 212, which also receives the speed density adjustment factor (SDAF) generated by speed density adjustment block 216 based on various speed related parameters (RPM, MAP) or constants (CONST).

Air charge estimation block 212 estimates the cylinder air charge ($AC_{EST}$) based on the received input(s), and this value is optionally adjusted by optional $AC_{EST}$ adjustment block 220 to obtain a final estimated air charge ($AC_{FINAL}$). In one exemplary implementation, block 220 is a two-dimensional (2D) surface based on IAT and ECT. The originally estimated air charge $AC_{EST}$ or the final estimated air charge $AC_{FINAL}$ is then used by the controller 172 for optimal combustion control of the engine 104 (e.g., fuel/spark control).

Figure 3A:
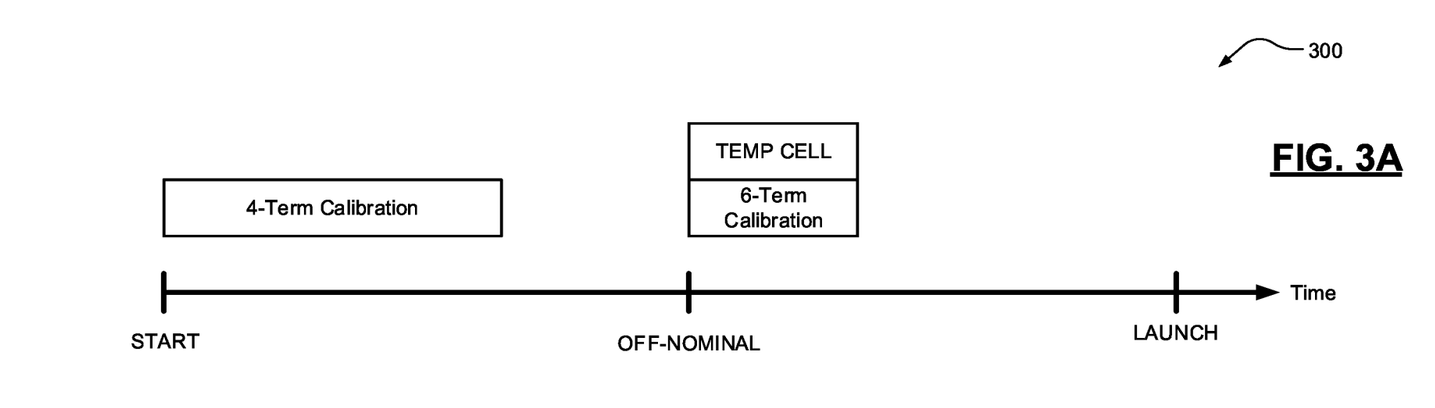
FIGS. 3A-3B are calibration period plots according to the principles of the present application.
Figure 3B:
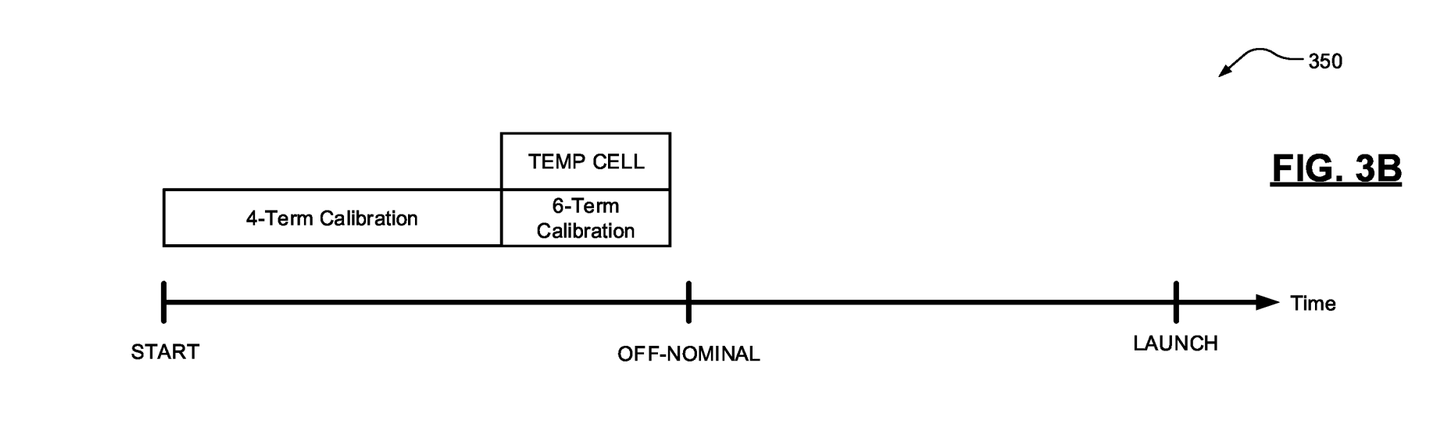

Referring now to FIGS. 3A-3B, calibration period plots 300, 350 according to the principles of the present application are illustrated. Both plots 300 define a calibration period from a start point (START) until vehicle launch (LAUNCH). Each calibration period is generally divided into two calibration sub-periods: a first calibration sub-period from the start point START during which nominal calibration data is typically collected up until a mid-point (OFF-NOMINAL) whereafter off-nominal calibration data is typically obtained. After this mid-point OFF-NOMINAL, off-nominal could or could not be collected and utilized to further train models up until the vehicle LAUNCH, recognizing that the closer time gets to the vehicle LAUNCH the more difficult it is to actually go back and adjust final models, which could potentially result in delayed vehicle launches. In conventional empirical based solutions, a large amount of off-nominal temperature data (e.g., ~1880 points), also known as a temperature cell data and abbreviated as "TEMP CELL") is typically gathered during this second calibration sub-period. According to the techniques of the present application, only an initial four-term calibration data collection (e.g., ~1100 points) could be performed, after which a smaller six-term calibration data collection (e.g., ~680 points) could be performed to obtain the TEMP CELL.

In one implementation of FIG. 3A, the smaller six-term calibration data collection could be performed immediately at the start of the second calibration sub-period, thereby shortening the calibration process compared to conventional solutions. More optimally, in FIG. 3B, this could all be fit into the first calibration sub-period, thereby eliminating the need for calibration data collection during the second calibration sub-period and reducing calibration time/effort and potentially expediting vehicle launches.

Figure 4:
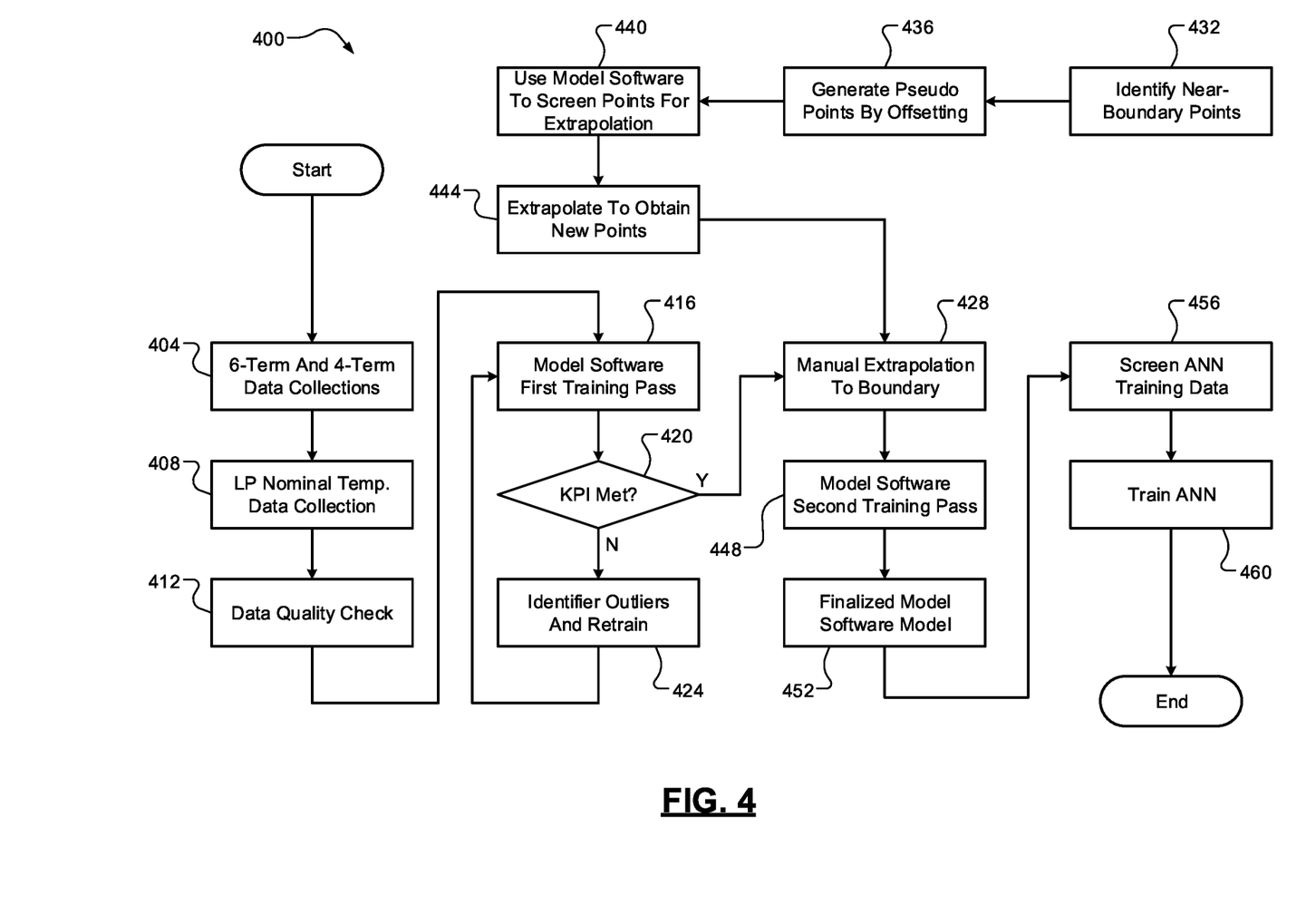
FIG. 4 is a flow diagram of an example calibration data collection and ANN training method according to the principles of the present application.

Referring now to FIG. 4, a flow diagram of an example calibration data collection and ANN training method 400 according to the principles of the present application is illustrated. This method 400 could be utilized, for example, to extrapolate additional training data (e.g., for off-nominal points) thereby further reducing calibration time/effort (e.g., by the external calibration system 176). At 404, the previously-described 4-term and 6-term data collections are obtained. At 408, a lock-pin (i.e., lock-pin camshaft positions) nominal temperature (temp) data collection is obtained (e.g., only ~100-200 points). This represents the boundary conditions for the ANN where the ANN could potentially start to deteriorate. At 412, a data quality check is performed to ensure the collected data is of sufficient quality and relatedness. Operations 404-412 could also be referred to as a "dyno data collection phase." At 416, modeling software (e.g., ETAS ASCMO software) performs a first training pass. At 420, it is determined whether key performance indicator(s) (KPI) are met. When false, outliers are identified and retrained at 424 and the method 400 returns to 416. When true, however, the method 400 proceeds to 428. Operations 416-424 could also be referred to as a "model software first pass."

At 428, manual extrapolation is performed to the ANN boundary conditions. In a separate portion of the method 400, which could also be referred to as a "data supplementation through linear extrapolation phase," the following is performed. At 432, near-boundary points are identified and, at 436, pseudo points are generated by offsetting the inputs. At 440, the modeling software is used to screen these points for extrapolation and, at 444, extrapolation is performed to obtain new points (i.e., additional training data), which is also utilized at 428. At 448, the modeling software performs a second training pass. At 452, the model software generates or outputs a final model. Operations 428 and 448-452 could also be referred to as a "data supplementation phase." At 456, the ANN training data is screened and at 460 the final model is trained using the screened ANN training data to obtain the trained ANN and the method 400 ends. Operations 456-460 could also be referred to as an "ANN training phase."

Figure 5:
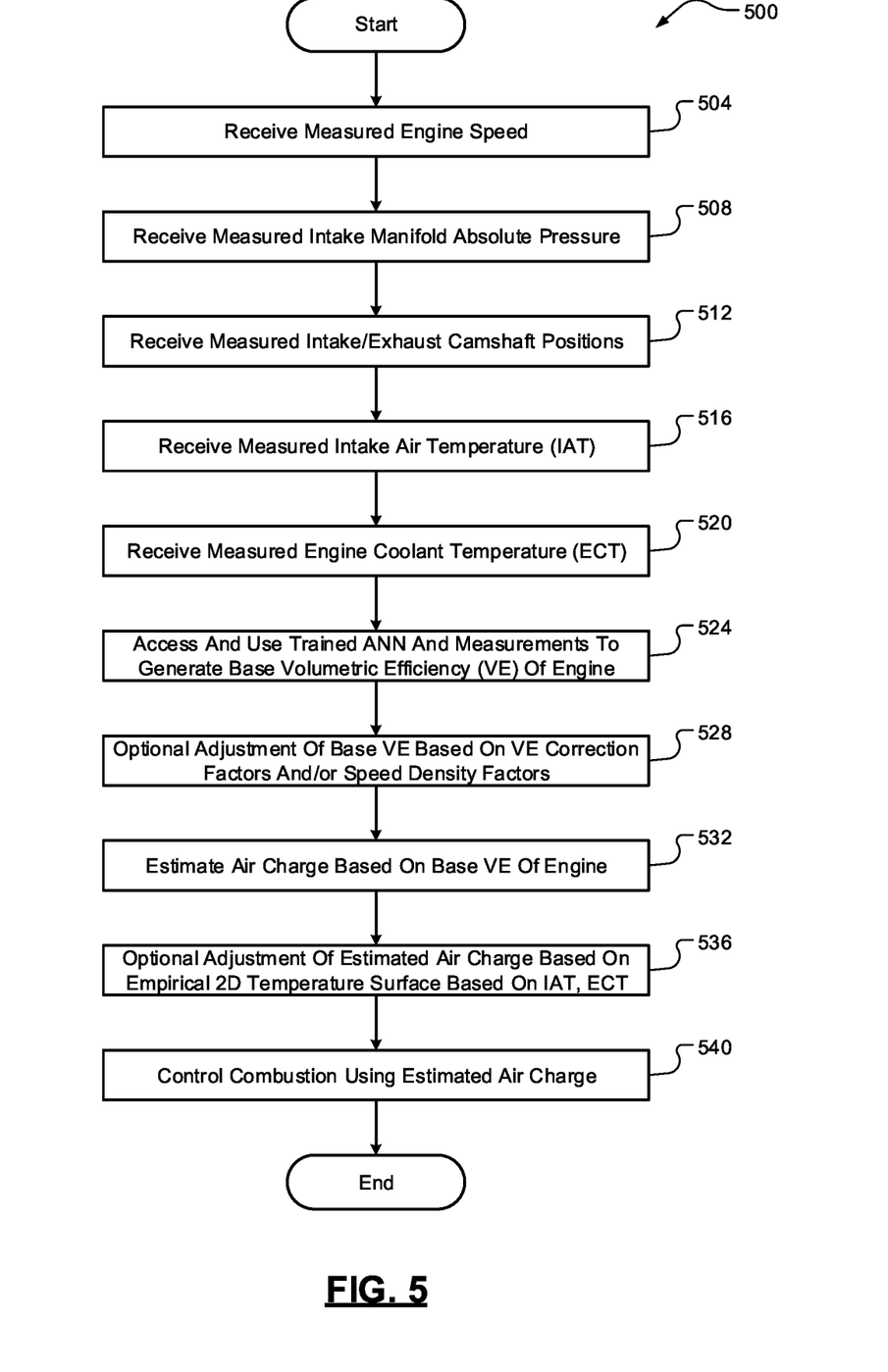
FIG. 5 is a flow diagram of an example combustion control method for an SI engine according to the principles of the present application.

Referring now to FIG. 5, a flow diagram of an example combustion control method 500 according to the principles of the present application is illustrated. While components of the vehicle 100 are specifically referenced, it will be appreciated that this method 500 could be applicable to any suitable vehicle. At 504, the controller 172 receives the measured engine speed from the engine speed sensor 150. At 508, the controller 172 receives the measured intake MAP from the intake MAP sensor 118. At 512, the controller 172 receives the measured intake/exhaust camshaft positions from the intake/exhaust camshaft position sensors 134, 166.

At 516, the controller 172 receives the measured IAT from the IAT sensor 120. At 520, the controller 172 receives the measured ECT from the ECT sensor 170. At 524, the controller 172 accesses the trained ANN and utilizes it to generate a base VE of the engine 104 based on the received measured parameters in 504-520.

At optionally 528, the controller 172 could adjust the base VE based on VE correction factor(s) and speed density correction factor(s). At 532, the controller 172 estimates the cylinder air charge based on the base VE of the engine 104. At optional 536, the controller 172 could adjust the estimated air charge based on an empirical 2D surface based on IAT and ECT. At 540, the controller 172 finally controls combustion (fuel, spark, etc.) based on the final estimated air charge to improve combustion stability, fuel economy, and/or torque response of the engine 104. The method 500 then ends or returns for another cycle.

It will be appreciated that the term "controller" as used herein refers to any suitable control device(s) that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A combustion control system for an engine of a vehicle, the combustion control system comprising:
   a set of sensors configured to measure at least six parameters including engine speed, engine intake manifold absolute pressure (MAP), intake and exhaust camshaft positions, intake air temperature (IAT), and engine coolant temperature (ECT); and
   a controller configured to:
      access a trained feedforward artificial neural network (ANN) configured to model a volumetric efficiency (VE) of the engine based on engine speed, engine intake MAP, intake and exhaust camshaft positions, IAT, and ECT;
      generate a base VE of the engine using the trained feedforward artificial neural network with the six measured parameters from the set of sensors as inputs;
      estimate an air charge mass flowing to each of at least one cylinder of the engine based on the base VE of the engine;
      perform a downstream adjustment of the estimated air charge mass based on a two-dimensional (2D) empirical surface having IAT and ECT as inputs; and
      control combustion in the at least one cylinder of the engine based on the adjusted estimated air charge mass to improve at least one of combustion stability, torque response, and fuel economy.

2. The combustion control system of claim 1, wherein the controller is further configured to perform a downstream adjustment of the base VE of the engine based on at least one of one or more VE correction factors and one engine speed density factor.

3. The combustion control system of claim 1, wherein the controller is further configured to access the trained feedforward ANN from an external calibration system that is configured to train an untrained ANN using calibration data collected by the external calibration system during a calibration period for the vehicle.

4. The combustion control system of claim 3, wherein:
   the calibration period is divided into (i) a first calibration sub-period where nominal calibration data is collected followed by (ii) a second calibration sub-period where off-nominal calibration data is collected up until vehicle launch; and
   the external calibration system is configured to, during the first calibration sub-period, collect a first set of calibration data for four of the six parameters including engine speed, intake MAP, and intake and exhaust camshaft positions.

5. The combustion control system of claim 4, wherein the external calibration system is configured to, during the first calibration sub-period and after collecting the first set of calibration data, collect a second set of calibration data comprising nominal calibration data for all six of the six parameters including IAT and ECT thereby eliminating the need for collection of calibration data during the second calibration sub-period.

6. The combustion control system of claim 1, wherein the inputs to the trained feedforward ANN are only the six measured parameters from the set of sensors.

7. The combustion control system of claim 1, wherein the trained feedforward ANN is defined by two layers with 12 neurons per layer.

8. The combustion control system of claim 1, wherein the set of sensors comprise (i) an engine speed sensor, (ii) an intake MAP sensor, (iii) intake and exhaust camshaft position sensors, (iv) an IAT sensor, and (v) an ECT sensor.

9. A combustion control method for an engine of a vehicle, the combustion control method comprising:
   accessing, by a controller of the vehicle, a trained feedforward artificial neural network (ANN) configured to model a volumetric efficiency (VE) of the engine based on engine speed, engine intake manifold absolute pressure (MAP), intake and exhaust camshaft positions, intake air temperature (IAT), and engine coolant temperature (ECT);
   receiving, by the controller and from a set of sensors of the vehicle, at least six measured parameters including engine speed, engine intake MAP, intake and exhaust camshaft positions, IAT, and ECT;
   generating, by the controller, a base VE of the engine using the trained feedforward artificial neural network with the six measured parameters from the set of sensors as inputs;
   estimating, by the controller, an air charge mass flowing to each of at least one cylinder of the engine based on the base VE of the engine;
   performing, by the controller, a downstream adjustment of the estimated air charge mass based on a two-dimensional (2D) empirical surface having IAT and ECT as inputs; and
   controlling, by the controller, combustion in the at least one cylinder of the engine based on the adjusted estimated air charge mass to improve at least one of combustion stability, torque response, and fuel economy.

10. The combustion control method of claim 9, further comprising performing, by the controller, a downstream adjustment of the base VE of the engine based on at least one of one or more VE correction factors and one engine speed density factor.

11. The combustion control method of claim 9, further comprising accessing, by the controller, the trained feedforward ANN from an external calibration system that is configured to train an untrained ANN using calibration data collected by the external calibration system during a calibration period for the vehicle.

12. The combustion control method of claim 11, wherein the calibration period is divided into (i) a first calibration sub-period where nominal calibration data is collected followed by (ii) a second calibration sub-period where off-nominal calibration data is collected up until vehicle launch, and further comprising:
    during the first calibration sub-period, collecting, by the external calibration system, a first set of calibration data for four of the six measured parameters including engine speed, intake MAP, and intake and exhaust camshaft positions.

13. The combustion control method of claim 12, further comprising during the first calibration sub-period and after collecting the first set of calibration data, collecting, by the external calibration system, a second set of calibration data for all six of the six measured parameters including IAT and ECT thereby eliminating the need for collection of calibration data during the second calibration sub-period.

14. The combustion control method of claim 9, wherein the inputs to the trained feedforward ANN are only the six measured parameters from the set of sensors.

15. The combustion control method of claim 9, wherein the trained feedforward ANN is defined by two layers with 12 neurons per layer.

16. The combustion control method of claim 9, wherein the set of sensors comprise (i) an engine speed sensor, (ii) an intake MAP sensor, (iii) intake and exhaust camshaft position sensors, (iv) an IAT sensor, and (v) an ECT sensor.

17. A combustion control method for an engine of a vehicle, the combustion control method comprising:
    accessing, by a controller of the vehicle, a trained feedforward artificial neural network configured to model a volumetric efficiency (VE) of the engine based on engine speed, engine intake manifold absolute pressure (MAP), intake and exhaust camshaft positions, intake air temperature (IAT), and engine coolant temperature (ECT),
    wherein the trained feedforward ANN is accessed from an external calibration system that is configured to train an untrained ANN using calibration data collected by the external calibration system during a calibration period for the vehicle, wherein the calibration period is divided into (i) a first calibration sub-period where nominal calibration data is collected followed by (ii) a second calibration sub-period where off-nominal calibration data is collected up until vehicle launch, and, during the first calibration sub-period, collecting, by the external calibration system, a first set of calibration data for engine speed, engine intake MAP, and intake and exhaust camshaft positions;
    receiving, by the controller and from a set of sensors of the vehicle, at least six measured parameters including engine speed, engine intake MAP, intake and exhaust camshaft positions, IAT, and ECT;
    generating, by the controller, a base VE of the engine using the trained feedforward artificial neural network with the six measured parameters from the set of sensors as inputs;
    estimating, by the controller, an air charge mass flowing to each of at least one cylinder of the engine based on the base VE of the engine;
    controlling, by the controller, combustion in the at least one cylinder of the engine based on the estimated air charge mass to improve at least one of combustion stability, torque response, and fuel economy.

* * * * *